Aug. 8, 1967 KEEZI KANEKO 3,334,835

FILM MAGAZINE FOR A MOVIE CAMERA

Filed Nov. 19, 1965 2 Sheets-Sheet 1

INVENTOR.
KEEZI KANEKO
BY
Buckman and Archer
HIS ATTORNEY

Aug. 8, 1967     KEEZI KANEKO     3,334,835

FILM MAGAZINE FOR A MOVIE CAMERA

Filed Nov. 19, 1965     2 Sheets-Sheet 2

INVENTOR.
KEEZI KANEKO
BY
Buckman and Archer
HIS ATTORNEY

United States Patent Office 3,334,835
Patented Aug. 8, 1967

3,334,835
FILM MAGAZINE FOR A MOVIE CAMERA
Keezi Kaneko, Kanagawa-ken, Japan, assignor to Fuji Shashin Film Kabushiki Kaisha, Kanagawa-ken, Japan, a corporation of Japan
Filed Nov. 19, 1965, Ser. No. 508,687
Claims priority, application Japan, Nov. 27, 1964, 39/91,513, 39/91,514; Dec. 7, 1964, 39/94,238, 39/94,239
11 Claims. (Cl. 242—71.2)

ABSTRACT OF THE DISCLOSURE

This film magazine includes an internally disposed guide surface for insuring a constant position of the film transverse the direction of travel.

---

The present invention relates to a film magazine for movie cameras, and more particularly to film guide means for such a film magazine.

The conventional film magazine for movie cameras has one or more guide means for guiding the film from the fresh film compartment through the exposing area to the wind up film compartment, however, none of them have positive action to maintain transverse position of the running film in a stable manner.

However, in such a film magazine wherein the film can be drawn back and redriven in order to effect overlapped exposure, it is important to maintain the transverse position of the film so as to ensure smooth film movement and eliminate vibration of the picture frame.

Accordingly, the present invention has an object to provide, in a film magazine for movie cameras, a guide means which serves to maintain the transverse position of the running film.

Another object of the present invention is to provide a guide means for such a film magazine which guides the film along its longitudinal passage while maintaining a stable transverse position of the film.

In accordance with the present invention, the above and other objects are attained by providing at least one guide surface which is not perpendicular to the bottom surfaces of magazine bodies. Said guide surface may be a rotatable surface or a stationary one.

In one aspect of the present invention, said surface is provided by a frusto-conical roller mounted rotatably about its longitudinal axis.

In another aspect of the present invention, said surface is provided by a barrel-shaped roller mounted rotatably about its longitudinal axis, and further aspect, by a roller with diameters linearly reducing from the middle portion toward both ends.

In further aspect, said surface is provided by an inclined wall of the magazine flange or by an inclined wall of a fixed post provided on the magazine body.

In order that the present invention may be more clearly understood and readily carried into effect, reference may now be had to the accompanying drawings in which several forms of the present invention are illustrated by way of example, and in which.

Figure 6A:
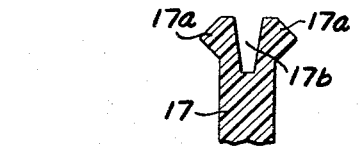
Figure 6B:
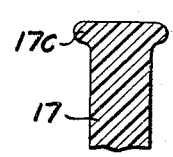
Figure 7:
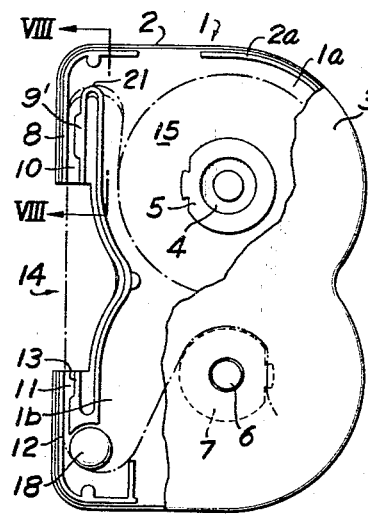
Figure 8:
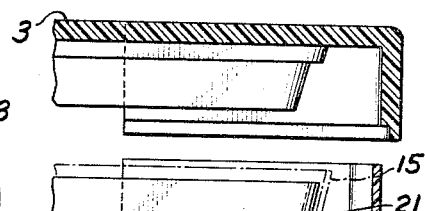
Figure 9:
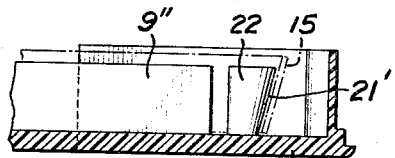
Figure 10:
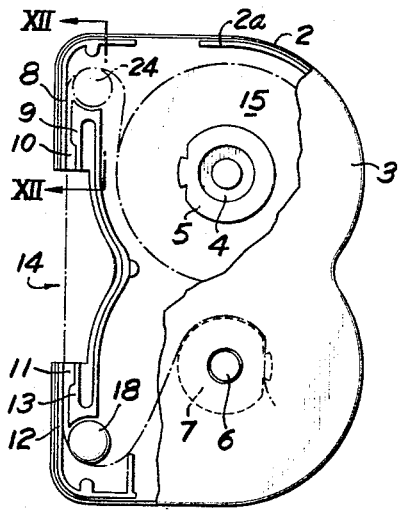
Figure 11:
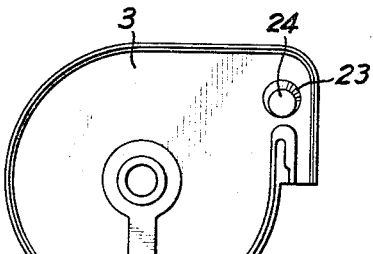
Figure 12:
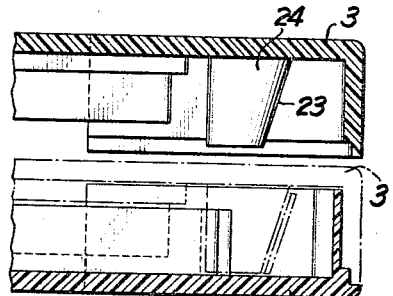

FIGS. 6a and 6b respectively show two different methods for holding the roller on the shaft;

FIG. 7 is a partially broken plan view of a film magazine in another aspect of the present invention;

FIG. 8 is an enlarged sectional view taken along the line VIII—VIII of FIG. 7 with the magazine bodies separated from each other;

FIG. 9 is a sectional view similar to FIG. 8 but showing a modification thereof;

FIG. 10 is also a partially broken plan view of a film magazine in a further aspect of the present invention;

FIG. 11 is an interior view of a portion of the lid used in the film magazine shown in FIG. 10; and FIG. 12 is an enlarged sectional view taken along the line XII—XII of FIG. 10 with the magazine bodies separated from each other.

Figure 1:
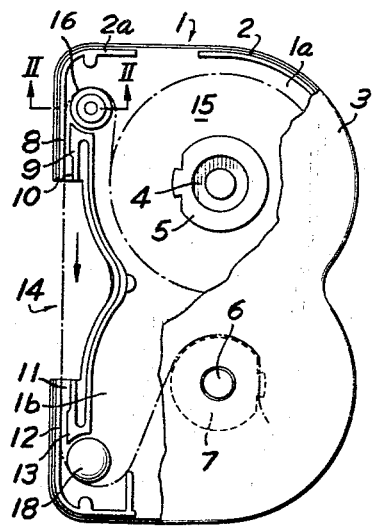
FIG. 1 is a partially broken plan view of a film magazine embodying the present invention.

Referring now to the drawings, particularly to FIG. 1, a magazine 1 is shown as constituted by two magazine bodies, i.e., a case 2 and a lid 3 which are mated with each other by means of light-proof engagement at their flange portions 2a and 3a. In the illustrated embodiment, the general shape of the magazine is like a figure 8 as clearly seen in FIG. 1, and a substantially circular fresh film compartment 1a and a substantially circular windup film compartment 1b are defined within it. At the center of the fresh film compartment 1a, there is provided a stub shaft 4 on which a film core 5 is rotatably mounted. At the center of the windup film compartment 1b, there is provided a similar stub shaft 6 on which a film core 7 for the woundup film is rotatably mounted.

The magazine 1 has a film outlet passage 10 at one side of the fresh film compartment 1a formed by means of a pair of parallelly extending straight flanges 8 and 9, and a film inlet passage 11 at one side of the windup film compartment 1b formed by means of a pair of parallelly extending straight flanges 12 and 13. The passages 10 and 11 are arranged with axially aligned and spaced relation to define an exposing area 14. The flanges 8, 9, 12 and 13 engage with correspondingly shaped flanges of the lid 3 in a light-proof manner as in the case of engagement between the flanges 2a and 3a.

As shown in FIG. 1, a fresh film 15 is wound around the core 5 in the fresh film compartment 1a, led through the paassage 10, the exposing area 14 and the passage 11 into the windup film compartment 1b, and secured at its one end on the core 7 rotatably mounted on the stub shaft 6.

It is already known to provide guide means for guiding from the fresh film compartment 1a to the passage 10 and/or from the passage 11 to the windup film compartment 1b. However, these conventional guide means have no positive action to maintain the transverse position of the running film in a stable manner. The above disadvantage can be overcome by the guide means in accordance with the present invention, wherein the guide means is not perpendicular, or forms an acute angle with respect to one side wall of the magazine.

Figure 2:
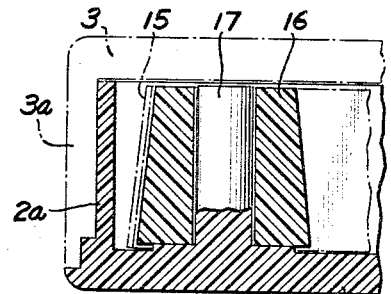
FIG. 2 is an enlarged sectional view taken along the line II—II of FIG. 1.

In the example shown in FIG. 2, the guide means of the present invention is arranged so as to guide the film from the fresh film compartment 1a to the passage 10. This guide means comprises a frusto-conical guide roller 16 rotatably mounted on a fixed shaft 17 formed integrally with the case 2. The guide means 18 (FIG. 1) for guiding the film from the passage 11 to the windup film compartment 1b is constituted by a conventional guide post.

In operation, the film 15 is intermittently driven by the drive mechanism of the camera, and moved from the fresh film compartment 1a through the passage 10, the exposing area 14 and the passage 11 into the windup film compartment 1b passing around the guide roller 16. The film 15 contacts with and is guided by the roller 16. Generally, this roller 16 is relatively small and the film 15 is driven intermittently and rapidly so that the guide roller 16 is rotated with high speed. Thus, the portion of the film 15 which is in contact with the guide roller 16 is urged toward the large diameter end of the roller 16. This serves to maintain stable the transverse position of the film, and thus even slight transverse instability of the film can be effectively eliminated. It will be noted that the guide roller 16 also effects a 180° change in the direction of film travel.

Figure 3:
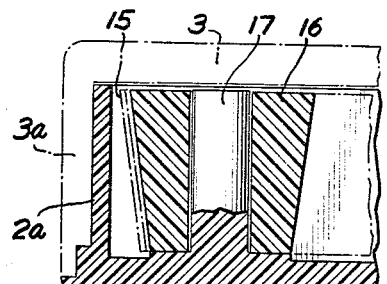
FIG. 3 shows a modified form of the portion shown in FIG. 2.

The roller 16 may be mounted with the large diameter end adjacent to the inner bottom surface of the case 2 as shown in FIG. 2 or with the small diameter end adjacent to the inner bottom surface of the case 2 as shown in FIG. 3.

Figure 4:
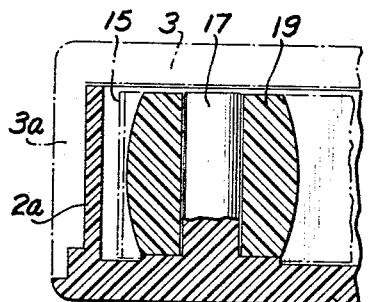
FIG. 4 is an enlarged sectional view similar to FIG. 2 but showing another embodiment of the present invention.
Figure 5:
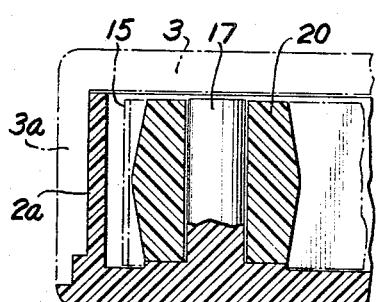
FIG. 5 is an enlarged sectional view similar to FIGS. 2 through 4 but showing a further embodiment.

The roller 16 need not necessarily be a frusto-conical-shaped roller but may be of different shape such as a barrel-shaped roller 19 as shown in FIG. 4 or a roller 20 with diameters linearly reducing from the middle portion toward both ends as shown in FIG. 5. In these cases, the film 15 is held in the transversely centered position.

The roller 16, 19 or 20 may be held on the shaft 17 against slipping off the shaft 17 when the lid 3 is removed from the case 2 by providing a bead 17a and a slit 17b at the end of the shaft 17 for snapping the roller on it or by crushing mechanically or thermally the end of the shaft 17 after insertion of the roller so as to form a bead 17c.

In the above examples, the shaft 17 is integrally formed with the case 2, however, it will be obvious to those skilled in the art that the shaft 17 may be formed on the lid 3.

FIGS. 7 and 8 show another embodiment of the present invention in which the guide roller 16, 19 or 20 is replaced by an inclined guide wall 21 formed on the case 2 of the magazine 1. In this case, the film 15 is urged toward the bottom wall of the case 2 and its transverse position is determined by contact with said bottom wall. The inclined guide wall 21' may be formed on a post 22 separated from the flange 9" of the case 2 as shown in FIG. 9.

FIGS. 10 to 12 show a further embodiment in which a guide post 24 having an inclined guide wall 23 similar to the wall 21' is provided on the lid 3. In this case, the operation is same as that of the examples shown in FIGS. 8 and 9.

The details of the structure may be modified substantially without departing from the spirit of the invention and exclusive use of such modifications as come within the scope of appended claims is contemplated.

I claim:
1. An improved film magazine for a movie camera having side walls and discrete portions for pay out and windup of film, said portions including a film outlet passage and a film inlet passage respectively, said passages being disposed to define an exposing area for the film, the improvement comprising guide means adjacent to said film outlet passage having a guide surface contacting the planar surface of said film, said guide surface forming an acute angle with at least one of said side walls.

2. A film magazine in accordance with claim 1 wherein said guide surface is provided by a roller rotatable about an axis perpendicular to said side walls.

3. A film magazine in accordance with claim 1, wherein said roller is a frusto-conical roller of which conical surface defines said guide surface.

4. A film magazine in accordance with claim 1 wherein said roller is a barrel-shaped roller of which barrel surface defines said surface for retaining the film in transversely centered position.

5. A film magazine in accordance with claim 1, wherein said roller is a roller with diameters linearly reducing from the middle portion thereof toward both ends.

6. A film magazine in accordance with claim 3, wherein said guide surface is provided by a guide post on one of said magazine bodies.

7. An improved film magazine as defined in claim 1 wherein said guide surface and side wall are the only elements in the magazine determining the transverse positioning of the film.

8. An improved film magazine as defined in claim 1 wherein said guide surface is disposed to direct and guide said film along a substantially linear path past said exposing area.

9. An improved film magazine as defined in claim 8 wherein said guide surface is disposed to effect a change in film direction of approximately 180°.

10. An improved film magazine as defined in claim 1, wherein said film outlet and film inlet passages each include flange means positioned substantially parallel to an external edge of said magazine and operative in conjunction with said external edge to guide said film in a straight line therebetween.

11. An improved film magazine as defined in claim 10, wherein said flange means at the outlet passage has said guide surface on the interior end thereof.

References Cited

UNITED STATES PATENTS

| | | | |
|---|---|---|---|
| 1,331,242 | 2/1920 | Convery. | |
| 2,423,562 | 7/1947 | Lee | 242—71.2 |
| 2,687,854 | 8/1954 | Lorig | 242—76 X |
| 2,916,228 | 12/1959 | Wellington | 242—76 |
| 3,001,440 | 9/1961 | Foster | 242—71.2 |
| 3,042,331 | 7/1962 | Bierman | 242—76 |

STANLEY N. GILREATH, *Primary Examiner.*

N. L. MINTZ, *Assistant Examiner.*